United States Patent
Kawamura

(10) Patent No.: US 9,777,843 B2
(45) Date of Patent: Oct. 3, 2017

(54) STEAM VALVE AND STEAM TURBINE

(71) Applicant: MITSUBISHI HEAVY INDUSTRIES COMPRESSOR CORPORATION, Tokyo (JP)

(72) Inventor: Yasuhiko Kawamura, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 14/893,904

(22) PCT Filed: Feb. 19, 2014

(86) PCT No.: PCT/JP2014/053919
§ 371 (c)(1),
(2) Date: Nov. 24, 2015

(87) PCT Pub. No.: WO2015/125238
PCT Pub. Date: Aug. 27, 2015

(65) Prior Publication Data
US 2016/0109026 A1    Apr. 21, 2016

(51) Int. Cl.
*F16K 1/32* (2006.01)
*F16K 15/06* (2006.01)
(Continued)

(52) U.S. Cl.
CPC .............. *F16K 1/34* (2013.01); *F01D 17/145* (2013.01); *F01D 25/166* (2013.01); *F01K 13/02* (2013.01);
(Continued)

(58) Field of Classification Search
CPC ...... F16K 1/34; F16K 15/063; F16K 27/0209; F16K 27/02; F16K 13/02; F16K 1/32;
(Continued)

(56) References Cited

U.S. PATENT DOCUMENTS 2,666,452 A    1/1954    Sheppard et al.
3,687,017 A    8/1972    Lewis et al.
(Continued)

FOREIGN PATENT DOCUMENTS

CN    85101818 A    1/1987
CN    2416308 Y    1/2001
(Continued)

OTHER PUBLICATIONS

Notice of Allowance mailed Jun. 14, 2016 in counterpart application No. JP 2015-545550 with an English translation.
(Continued)

Primary Examiner — Marina Tietjen
(74) Attorney, Agent, or Firm — Birch, Stewart, Kolasch & Birch, LLP

(57) ABSTRACT

A steam valve includes a valve body having a valve seat in a steam channel, a valve stem configured to close the steam channel by coming in contact with the valve seat and to open the steam channel by moving from the valve seat and a guide portion configured to slidably guide the valve stem in a moving direction thereof. The guide portion has a guide body that encloses the valve stem from a radial outer side of the valve stem and a guide bush that is detachably fixed inside the guide body, has an inner surface which abuts and slides on an outer circumferential surface of the valve stem, and is formed of a material having corrosion resistance.

4 Claims, 3 Drawing Sheets

(51) Int. Cl.
*F16K 27/02* (2006.01)
*F16K 27/08* (2006.01)
*F16K 1/34* (2006.01)
*F01D 17/14* (2006.01)
*F01D 25/16* (2006.01)
*F01K 13/02* (2006.01)

(52) U.S. Cl.
CPC ............. *F16K 1/32* (2013.01); *F16K 15/063* (2013.01); *F16K 27/02* (2013.01); *F16K 27/0209* (2013.01); *F16K 27/08* (2013.01); *F05D 2220/31* (2013.01); *F05D 2260/57* (2013.01); *F05D 2270/62* (2013.01); *F05D 2300/172* (2013.01); *F05D 2300/501* (2013.01); *F05D 2300/506* (2013.01)

(58) Field of Classification Search
CPC ...... F16K 27/08; F01D 17/145; F01D 25/166; F05D 2260/57; F05D 2300/506; F05D 2300/172; F05D 2270/62; F05D 2220/31; F05D 2300/501
USPC ................ 251/63.6, 319–324, 214
See application file for complete search history.

(56) References Cited

U.S. PATENT DOCUMENTS

| | | | |
|---|---|---|---|
| 3,726,187 A | 4/1973 | Lewis | |
| 6,357,470 B1* | 3/2002 | Evans | F16L 41/16 137/315.01 |
| 2006/0048513 A1* | 3/2006 | Fukuda | F16K 49/005 60/645 |
| 2014/0234084 A1 | 8/2014 | Katagake | |

FOREIGN PATENT DOCUMENTS

| | | |
|---|---|---|
| CN | 2517919 Y | 10/2002 |
| CN | 201065946 Y | 5/2008 |
| CN | 102052493 A | 5/2011 |
| CN | 201877136 U | 6/2011 |
| GB | 1085235 A | 9/1967 |
| JP | 56-31602 U | 3/1981 |
| JP | 57-188719 A | 11/1982 |
| JP | 58-174765 A | 10/1983 |
| JP | 59-82503 A | 5/1984 |
| JP | 8-93928 A | 4/1996 |
| JP | 2009-174324 A | 8/2009 |
| JP | 2010-43566 A | 2/2010 |
| JP | 2011-190478 A | 9/2011 |
| JP | 2012-87841 A | 5/2012 |
| JP | 2013-72349 A | 4/2013 |
| JP | 2015-48742 A | 3/2015 |
| WO | WO 2013/047423 A1 | 4/2013 |
| WO | WO 2014/147832 A1 | 9/2014 |

OTHER PUBLICATIONS

International Search Report issued in PCT/JP2014/053919, mailed on May 20, 2014.
Written Opinion issued in PCT/JP2014/053919, mailed on May 20, 2014.
JSME Mechanical Engineering Dictionary, 1st edition, The Japan Society of Mechanical Engineers, Aug. 20, 1997, p. 148.
Chinese Office Action and Search Report dated Mar. 25, 2016, for Chinese Application No. 201480029630.X with the English translation.
Extended European Search Report dated Apr. 20, 2016, for European Application No. 14883018.5.

* cited by examiner

STEAM VALVE AND STEAM TURBINE

TECHNICAL FIELD

The present invention relates to a steam valve and a steam turbine.

BACKGROUND ART

Steam turbines are used, for instance, for driving machines, and are equipped with a turbine casing having a rotor that is rotatably supported. Steam acting as a working fluid is supplied to the turbine casing, and thereby the rotor is rotatably driven. The steam supplied to the turbine casing or steam extracted from the turbine casing flows through a steam channel of the steam turbine. A steam valve is provided for the steam channel. The flow rate of the steam supplied to the turbine casing can be adjusted by the degree to which the steam valve opening is adjusted.

Such a steam valve, as disclosed in, for example, Patent Literature 1, generally uses a constitution in which a valve stem and a bush, and a sleeve and a valve plug slide to control a flow rate of steam. Here, in this steam valve, for the purpose of improving wear resistance of a sliding part, it is proposed that the surface of a base constituting the sliding part is formed with an oxide film composed of an oxide of an element having the same component as the base.

CITATION LIST

Patent Literature

[Patent Literature 1]
Japanese Unexamined Patent Application, First Publication No. 2011-190478

SUMMARY OF INVENTION

Technical Problem

However, even if an oxide film is formed as in Patent Literature 1 above, to maintain the wear resistance over a long period of time is accompanied with difficulties. For this reason, once wear occurs at the oxide film, corrosion (formation of rust) progresses from a region of the wear. When such rust is formed, there is a possibility of the sliding part sticking and having a problem with the operation of a machine.

Further, when a surface treatment including the formation of the oxide film is performed on a metal member, the hardness is generally increased, and thus there is a possibility of wearing a member sliding and abutting on the metal member. In addition, when damage to the member subjected to the surface treatment occurs, there is a need to replace the entire member, and thus an increase in maintenance cost can also be thought.

The present invention has been made in view of the above circumstances, and an object of the present invention is to provide a steam valve that can be used over a long period of time and is improved in maintainability.

Solution to Problem

The present invention employs the following means in order to address the problems.

A steam valve according to an aspect of the present invention includes a valve body including a valve seat in a steam channel, a valve stem configured to close the steam channel by coming in contact with the valve seat and to open the steam channel by moving from the valve seat, and a guide portion configured to slidably guide the valve stem in a moving direction thereof. The guide portion comprises a guide body that is covering the valve stem from a radial outer side thereof; and a guide bush that is detachably attached inside the guide body, has an inner surface which abuts and slides on an outer circumferential surface of the valve stem, and is formed of a material having corrosion resistance.

According to such a constitution, the guide bush is formed of a metal having corrosion resistance and is detachably attached to the guide body. Thus, the guide bush can be used over a long period of time without causing corrosion. In addition, when a need to replace the guide bush occurs, the guide bush is removed from the guide body. Thereby, the guide portion can be easily replaced with a new guide bush.

Further, in a steam valve according to another aspect of the present invention, the guide bush may be formed of a material having a lower hardness than the material of which the valve stem is formed.

According to such a constitution, the guide bush can be inhibited from causing damage to the valve stem.

In addition, in a steam valve according to another aspect of the present invention, the guide bush may be formed of brass.

According to such a constitution, due to corrosion resistance which brass has, corrosion occurring at the guide brush can be limited.

Further, a steam valve according to another aspect of the present invention may further include a steam valve spring which extends in the moving direction, one end of which is fixed to the valve stem, an other end of which comes into contact with the guide body, and which biases the valve stem in a direction in which the valve stem is brought into contact with the valve seat. The guide body may be formed of a metal having a higher modulus of rigidity than the guide bush.

According to such a constitution, the guide body having the high modulus of rigidity can receive an elastic force of the steam valve spring. Here, when the guide portion is formed as one member by brass that generally has high corrosion resistance and a low modulus of rigidity, the guide portion deformation may be caused due to the elastic force of the steam valve spring. However, the guide portion is formed by two members of the guide body and the guide bush, and the guide body having the higher modulus of rigidity than the guide bush receives the elastic force of the steam valve spring. Therefore, the possibility of the guide portion being deformed can be reduced.

Further, a steam turbine according to a second aspect of the present invention comprises the steam valve described in each of the aforementioned aspects.

Advantageous Effects of Invention

According to the steam valve and the steam turbine of the present invention, the steam valve and the steam turbine has improved maintainability and can be used over a long period of time.

DESCRIPTION OF EMBODIMENTS

Hereinafter, a steam turbine according to an embodiment of the present invention will be described based on the drawings.

Figure 1:
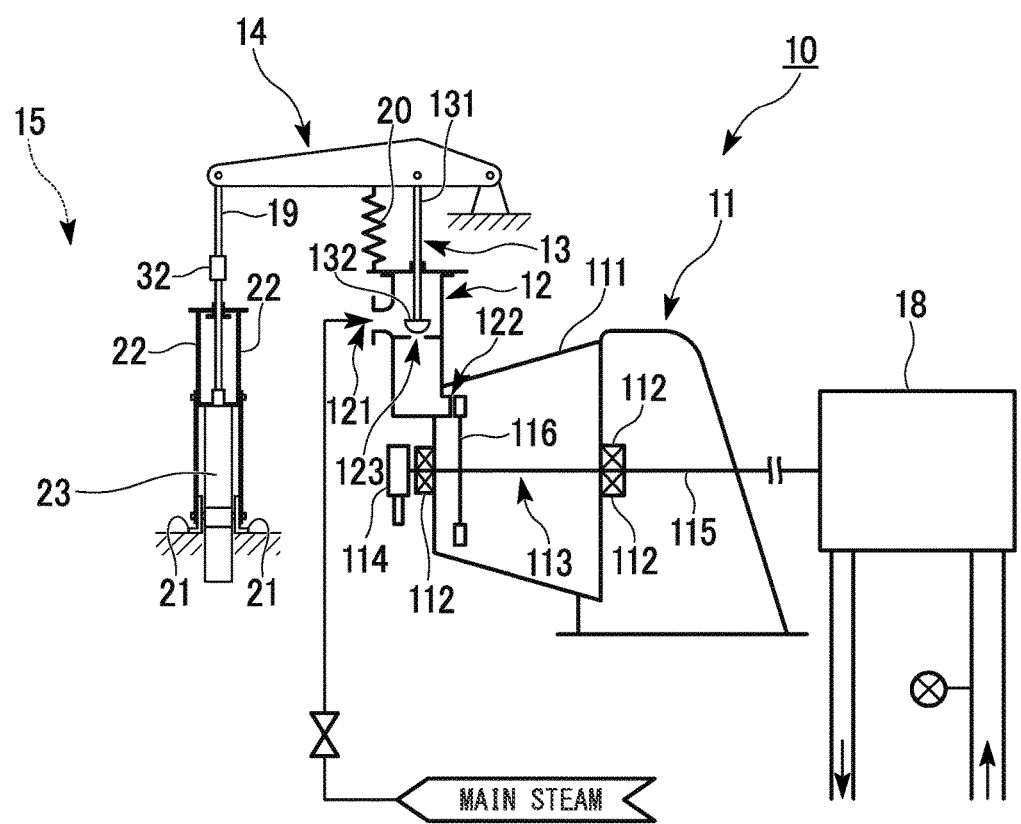
FIG. 1 is a view showing the constitution of a steam turbine to which a steam valve according to an embodiment of the present invention is applied.

FIG. 1 is a view showing a constitution of a steam turbine 10 of this embodiment.

As shown in FIG. 1, the steam turbine 10 of this embodiment is equipped with a turbine body 11, a steam channel 12 through which steam acting as a working fluid flows, a steam valve 13, a lever member (valve plug reciprocating mechanism) 14, and a steam valve driving mechanism 15.

(Turbine Body)

The turbine body 11 has a tubular casing 111, bearings 112 that are provided in the casing 111, a rotor 113 that is rotatably supported by the bearings 112 and is disposed inside the casing 111, and a speed detection sensor 114 that detects the rotational speed of the rotor 113. Additionally, the rotor 113 is equipped with a rotary shaft 115, and a plurality of blades 116 that are fixed to the rotary shaft 115.

The blades 116 configured in this way are rotated by steam, and a compressor 18 is driven by the rotational force of the blades 116.

(Steam Channel)

The steam channel 12 is a channel that supplies steam acting as the working fluid to the turbine body 11.

The steam is introduced from a steam inlet 121 at one end side of the steam channel 12. A steam supply port 122 at the other end side of the steam channel 12 is connected to the turbine body 11. Also, a valve seat 123 is provided between the steam inlet 121 and the steam supply port 122. The valve seat 123 has narrowly constricting the width of the steam channel 12. In the embodiment, as the "steam channel" according to the present invention, the channel along which the steam supplied to the turbine body 11 flows has been described by way of example. However, the steam channel 12 is not limited thereto, and may be, for instance, a channel along which steam extracted from the turbine body 11 flows.

(Lever Member)

The lever member 14 is a member that transmits output of the steam valve driving mechanism 15 to the steam valve 13 and reciprocates the valve plug 132 with respect to the steam channel 12. A longitudinal base end of the lever member 14 is rotatably supported. Additionally, one end of a lever-side rod 19 is rotatably attached to a longitudinal leading end of the lever member 14. The other end of a valve stem 131 constituting the steam valve 13 is rotatably attached to a longitudinal intermediate portion of the lever member 14. Further, one end of an extension spring 20 is attached to the lever member 14 at a leading end side relative to a position at which the valve stem 131 of the steam valve to be described below is attached. The extension spring 20 functions as a forcibly closing means for forcibly closing the steam valve 13. The other end of the extension spring 20 is fixed to, for instance, a frame (not shown) of the steam channel 12, and is immovable. That is, the extension spring 20 gives a tensile force that rotates the lever member 14 in a counterclockwise direction in FIG. 1 in a state in which no external force is applied.

(Steam Valve Driving Mechanism)

The steam valve driving mechanism 15 is a mechanism that drives the steam valve 13. The steam valve driving mechanism 15 is equipped with an actuator (cylinder) 23. The actuator 23 is equipped with a pair of brackets 21 that are fixedly installed, and a holding member 22 that is rotatably supported by the brackets 21. The actuator 23 is held to the holding member 22.

(Steam Valve)

Figure 2:
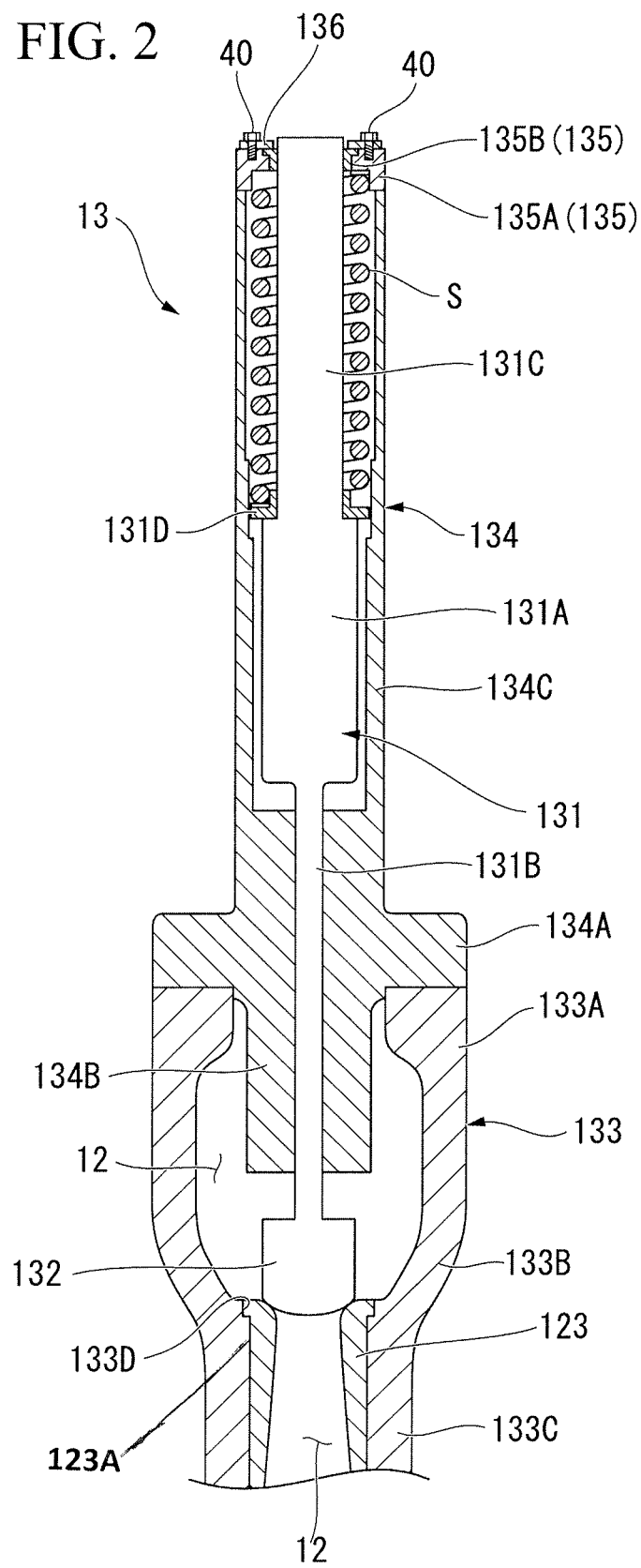
FIG. 2 is a sectional view of the steam valve according to the embodiment of the present invention.

Subsequently, a structure of the steam valve 13 will be described with reference to FIGS. 2 to 4. The steam valve 13 adjusts an amount of the steam supplied to the turbine body 11. The steam valve 13 is equipped with a rod-shaped valve stem 131, a valve plug 132 that is provided at one end of the valve stem 131 and has a substantially columnar shape, a valve body 133 that has the valve seat 123 in the steam channel 12, a cylinder 134 that is connected to the valve body 133 and encloses the valve stem 131 from a radial outer side of the valve rod, a guide portion 135 that is provided at an upper end of the cylinder 134, and a lid 136 that is detachably attached to the guide portion 135.

In the following description, a direction directed from the valve body 133 toward the cylinder 134 is defined as an upward direction, and a direction opposite to the upward direction is defined as a downward direction.

The valve stem 131 is a member having an approximate rod shape. The other end of the valve stem 131 is rotatably attached to the longitudinal intermediate portion of the lever member 14. To be specific, the valve stem 131 is formed such that upper and lower portions thereof are different in a radial dimension. That is, the valve stem 131 is provided with a step-like structure at which the radial dimension is sharply changed in midway in an upward/downward direction. A portion located above the step-like structure has a diameter set to be relatively larger than the step-like structure and serves as a cylinder section 131A. On the other hand, a portion located below the step-like structure is set to have a smaller diameter than the cylinder section 131A and to form a connector 131B.

Further, the cylinder section 131A is provided with a step-like structure at which the radial dimension is sharply changed in the approximate middle thereof in an upward/downward direction. A spring support 131D that supports a steam valve spring S to be described below and receives an elastic force of the steam valve spring S is provided at a position of the step-like structure. The spring support 131D is an annular member that extends throughout an outer circumference of the cylinder section 131A in an outline view. A portion located above the step-like structure position at which the spring support 131D is provided serves as a cylinder upper body 131C.

The valve plug 132 is a member that has a lower end formed in an approximately hemispherical shape and is formed in a substantially columnar shape as a whole.

The valve body 133 is a member having a substantially cylindrical shape. The valve stem 131 and the valve plug 132 are disposed inside the valve body 133. Also, the aforementioned valve seat 123 is provided at a lower end of the valve body 133. To be more specific, an upper portion of the valve body 133 has outer and inner diameters set to be substantially constant in a height direction and serves as a large diameter portion 133A. Further, a portion starting from the large diameter portion 133A has a diameter which is gradually reduced toward a lower portion thereof and forms a reduced diameter portion 133B. A portion below the reduced diameter portion 133B serves as a small diameter portion 133C having a fixed diameter in a vertical direction. The diameter of the small diameter portion 133C is set to be smaller than that of the large diameter portion 133A, and to be approximately identical to that of the lower side of the reduced diameter portion 133B. Further, an upper end of the small diameter portion 133C at an inner side in a radial direction is provided with a cutout portion 133D with a diameter which slightly increases over a predetermined vertical dimension.

A radial inner surface of the small diameter portion 133C of the valve body 133 is provided with the valve seat 123 in the vertical direction. The valve seat 123 is a cylindrical member. The wall thickness of the valve seat 123 is set to be substantially uniform in the vertical direction. An upper end of the valve seat 123 is provided with a flange portion 123A that extends toward a radial outer side in a generally plate shape. The flange portion 123A is fitted with the cutout portion 133D provided for the small diameter portion 133C of the valve body 133. Also, an inner space of the valve body 133 forms a part of the steam channel 12. Further, the inner space communicates with the other part of the steam channel 12 through a pipe line (not shown) provided on a lateral surface of the large diameter portion 133A in the valve body 133.

The cylinder 134 is a cylindrical member connected to the upper portion of the valve body 133. A cylinder flange portion 134A extending toward the radial outer side in a plate shape is provided at a midway position of the cylinder 134 in the vertical direction. A cylinder lower portion 134B that is a portion below the cylinder flange portion 134A is inserted into the aforementioned valve body 133. A cylinder upper portion 134C that is a portion above the cylinder flange portion 134A is formed in a cylindrical shape having an inner diameter substantially equal to an outer diameter of the aforementioned cylinder section 131A. On the other hand, an inner diameter of the cylinder lower portion 134B including the cylinder flange portion 134A is set to be approximately equal to an outer diameter of the aforementioned connector 131B.

The guide portion 135 is provided at the upper end of the aforementioned cylinder 134. The guide portion 135 is a member that has a substantially annular shape in an outline view. The guide portion 135 has a guide body 135A that forms a radial outer region, and a guide bush 135B that is detachably attached inside the guide body 135A. The guide bush 135B has an inner diameter set to be approximately the same as an outer diameter of the cylinder upper body 131C at the aforementioned valve stem 131, and is adapted to be slidable relative. That is, an inner surface of the guide bush 135B and an outer circumferential surface of the valve stem 131 are formed to slide relative to each other.

The guide body 135A is a member having a cylindrical shape in an outline view. A predetermined vertical region of an inner circumferential surface of the guide body 135A protrudes toward a radial inner side to form a protrusion 135C. Further, a surface forming an upper side of the protrusion 135C extends on a plane perpendicular to the vertical direction to form a protrusion backup surface 135E. The protrusion backup surface 135E has an annular shape in an outline view. In addition, a radial outer end of the protrusion backup surface 135E extends upward to form a backup surface lateral portion 135F.

Also, the inner circumferential surface of the guide body 135A is formed such that an upper end of the inner circumferential surface has a larger inner diameter than a lower end of the inner circumferential surface. An inner circumference of the protrusion 135C has a dimension set to be approximately the same as an outer diameter of a guide bush cylinder 138 at the guide bush 135B to be described below.

The guide body 135A is formed of a metal material having a higher modulus of rigidity than the guide bush 135B to be described below.

The guide bush 135B is formed of a material having corrosion resistance. As a high corrosion-resistant material, for example, a copper alloy such as brass, stainless steel (SUS), an aluminum alloy (e.g. an aluminum-silicon alloy such as A4032), a nickel alloy (nickel-chromium steel), or a titanium alloy is suitable. Here, in view of the fact that the valve stem 131 including the cylinder section 131A is generally formed of carbon steel, brass having lower hardness than carbon steel is most preferably used for the guide bush 135B.

The guide bush 135B may be formed of a resin material having corrosion resistance equivalent to each of the aforementioned materials (the copper alloy, the stainless steel, the aluminum alloy, the nickel alloy, the titanium alloy, etc.).

A detailed shape of the guide bush 135B will be described with reference to FIG. 4. FIG. 4 is a perspective view of the guide bush 135B when obliquely viewed from above in a state in which the guide bush 135B is placed on a horizontal surface. As shown in FIG. 4, the guide bush 135B is made up of a guide bush cylinder 138 whose outer and inner diameters are uniformly set together in a vertical direction, and a guide bush flange portion 137 that extends from an upper end of the guide bush cylinder 138 toward a radial outer side in a plate shape and has an annular shape in an outline view. A lower surface of the guide bush flange portion 137 extends on a surface perpendicular to an axis of the guide bush cylinder 138 to form a flange portion lower surface 137A. A surface facing the flange portion lower surface 137A in the vertical direction is formed to extend on a surface parallel to the flange portion lower surface 137A to form a flange portion upper surface 137B. Further, the flange portion lower surface 137A and the flange portion upper surface 137B serve as a flange portion lateral surface 137C that extends in the vertical direction in a cylindrical shape in an outline view. An inner circumferential surface 139 of the guide bush 135B is smoothly formed in the vertical direction.

The guide body 135A and the guide bush 135B configured in this way are mutually detachably attached. The guide body 135A and the guide bush 135B form the guide portion 135. To be more specific, the protrusion 135C of the guide body 135A comes into contact with an outer circumferential surface of the guide bush cylinder 138 with no clearance. The protrusion backup surface 135E of the guide body 135A comes into contact with the flange portion lower surface 137A of the guide bush flange portion 137 with no clearance. Further, the backup surface lateral portion 135F of the guide body 135A comes into contact with the flange portion lateral surface 137C of the guide bush flange portion 137 with no clearance. Furthermore, lower end faces of the guide body 135A and the guide bush 135B are formed to constitute a single smooth plane.

Figure 3:
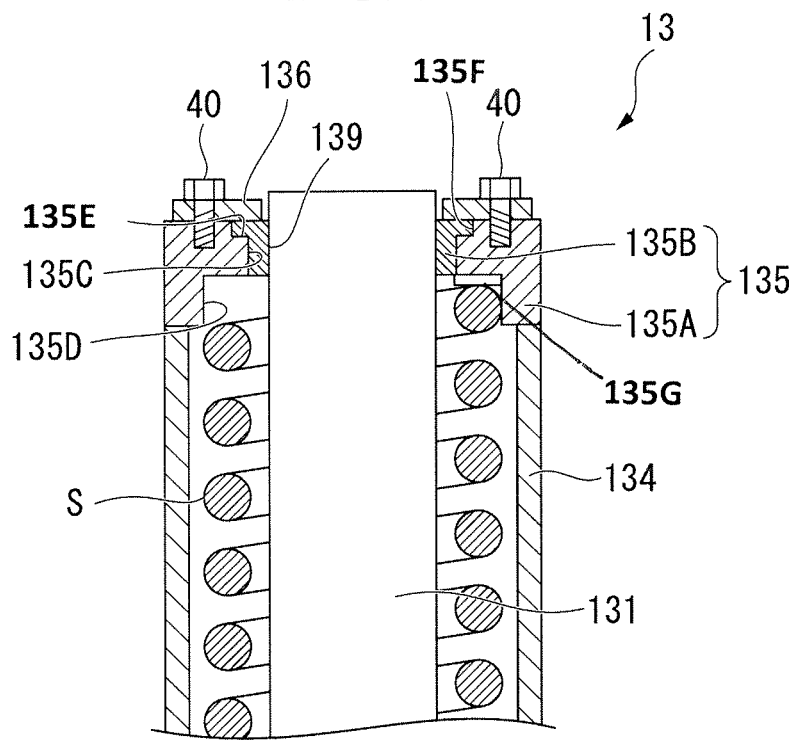
FIG. 3 is an enlarged view of principal parts of the steam valve according to the embodiment of the present invention.
Figure 4:
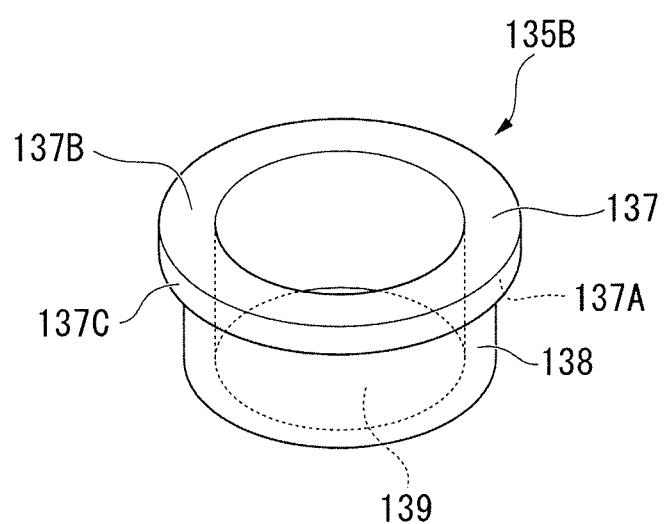
FIG. 4 is a perspective view showing an outline of a guide bush according to an embodiment of the present invention.

As shown in FIG. 3, a space is formed in the lower portion of the guide portion 135 at the inner side in the radial direction. An upper end of the steam valve spring S to be described below is housed in the space. The space is defined by a spring receptacle 135D. An upper surface of the spring receptacle 135D is formed by the lower end faces of the guide body 135A and guide bush 135B described above.

At this time, an end of the steam valve spring S is fixed to the spring receptacle 135D so as to contact with a spring receptacle upper surface 135G.

In this way, a lower surface of the guide portion 135 at the inner side in the radial direction becomes the spring receptacle 135D. Thus the elastic force of the steam valve spring S is applied to the lower surface. Therefore, here, when the guide body 135A and the guide bush 135B are formed of brass together as one member, due to a low modulus of rigidity of brass, the guide portion 135 may be deformed by the elastic force of the steam valve spring S.

However, in the present embodiment as described above, the guide portion 135 is formed by two members of the guide body 135A and the guide bush 135B. In addition, the guide body 135A receiving the elastic force of the steam valve spring S is formed of a metal material having a higher modulus of rigidity than the guide bush 135B.

Accordingly, it is possible to reduce a possibility of the guide portion 135 causing deformation due to the elastic force of the steam valve spring S.

Also, the lid 136 is fixed to an upper surface of the guide portion 135 by bolts 40 so as to cover the upper surface of the guide portion 135. The lid 136 is a member having an annular shape in an outline view, and is formed such that an inner surface thereof at the inner side in the radial direction has an opening whose diameter is approximately equal to the outer diameter of the cylinder upper body 131C. To be more specific, in the state in which the lid 136 is fixed to the upper surface of the guide portion 135, the inner surface of the lid 136 at the inner side in the radial direction is formed to be separated from the outer circumferential surface of the valve stem 131 by a fixed distance.

The steam valve spring S is an elastic member provided at the radial inner side of the cylinder 134 in the vertical direction. The steam valve spring S is biased such that opposite ends thereof in the vertical direction are directed in directions separated from each other. As described above, the upper end of the steam valve spring S is supported by the spring receptacle 135D of the guide body 135, and the lower end of the steam valve spring S is supported by the spring support 131D provided on the valve stem 131.

Next, an operation of the steam valve configured as described above will be described.

First, as the aforementioned steam valve driving mechanism 15 is driven, the lever member 14 is operated. The lever member 14 is connected to the valve stem 131, and thus the valve stem 131 undergoes linear movement with the operation of the lever member 14.

Further, as the valve stem 131 moves linearly along the steam channel 12, the valve plug 132 at the leading end of the valve stem 131 is fitted with or separated from the valve seat 123 in the steam channel 12. At this time, the valve stem 131 moves linearly, i.e. the cylinder upper body 131C slides on the guide portion 135, and thereby a moving direction thereof is guided.

Thus, a size of an opening between the valve seat 123 and the valve plug 132 is changed. As a result, a flow rate of the steam supplied to the steam channel 12 and the turbine body 11 via the valve seat 123 is changed. A state in which the valve plug 132 of the steam valve 13 is fitted (brought into contact) with the valve seat 123 of the steam channel 12 is referred to as a closed state. On the other hand, a state in which the valve plug 132 is separated from the valve seat 123 is referred to as an opened state. Also, an operation of performing a transition between the closed state and the opened state is referred to as a switching operation.

Upon operating the turbine body 11, it is necessary to perform the switching operation of the steam valve 13 depending on an operating situation or requested output of the turbine body. When the switching operation is repeated, the guide bush 135B of the guide portion 135 and the cylinder upper body 131C of the valve stem 131 slide relative to each other in connection with the linear movement of the valve stem 131.

Here, when the steam valve 13 is in the opened state, the cylinder upper body 131C comes partly out of the cylinder 134 and is exposed to open air. Therefore, when the turbine body 11 is installed, for instance, in an environment in which a moisture content in an atmosphere is high and salt is also contained in the atmosphere such as a coastal district, corrosion caused by oxidation easily progresses on an outer surface of the cylinder upper body 131C. If such corrosion progresses, the cylinder upper body 131C and the guide bush 135B may stick to each other due to rust.

However, in the steam valve 13 according to the present embodiment, since the guide bush 135B is formed of a highly corrosion-resistant metal (brass), it is difficult for the guide bush 135B to generate rust caused by, for instance, oxidation. Therefore, even if the cylinder upper body 131C generates rust due to the oxidation, the rust does not erode the guide bush 135B. That is, the cylinder upper body 131C and the guide bush 135B can be inhibited from sticking to each other due to such rust. Accordingly, the steam valve 13 that can be used over a long period of time and has improved maintainability, and the steam turbine 10 having the steam valve 13 can be provided.

In addition, in the present embodiment, the guide bush 135B is formed of a material having lower hardness than a material of which the cylinder upper body 131C (valve stem 131) is formed. Therefore, the guide bush 135B can be inhibited from causing damage such as scratches on the cylinder upper body 131C (valve stem 131). Accordingly, the steam valve 13 that can be used over a long period of time and has improved maintainability, and the steam turbine 10 having the steam valve 13 can be provided.

Also, in the present invention, the lid 136 is fixed to the upper surface of the guide portion 135 by the bolts 40 so as to cover the upper surface of the guide portion 135. Thus, an area of the guide portion 135 exposed to the open air is reduced, and thus a possibility of corrosion occurring at the guide portion 135 (guide bush 135B) can be further reduced. Accordingly, the steam valve 13 that can be used over a long period of time and has improved maintainability, and the steam turbine 10 having the steam valve 13 can be provided.

Although the embodiment of the present invention has been described above in detail with reference to the drawings, the specific constitution is not limited to the embodiment, and also includes a change in design, etc. without departing from the scope of the present invention.

INDUSTRIAL APPLICABILITY

The steam valve according to the present invention can be applied to a steam turbine.

REFERENCE SIGNS LIST 10 steam turbine
11 turbine body
12 steam channel
13 steam valve
14 lever member (valve plug advancing/retracting mechanism)
15 steam valve driving mechanism
18 compressor
19 lever-side rod
20 extension spring 21 bracket
22 holding member
23 actuator (cylinder)
32 coupling mechanism
38 connection switching part
40 bolt
112 bearing
113 rotor
114 speed detection sensor
115 rotary shaft
116 blade
123 valve seat
131 valve stem
131A cylinder section
131B connector
131C cylinder upper body
131D spring support
132 valve plug
133 valve body
133A large diameter portion
133B reduced diameter portion
133C small diameter portion
133D cutout portion
134 cylinder
134A cylinder flange portion
134B cylinder lower portion
134C cylinder upper portion
135 guide portion
135A guide body
135B guide bush
135C protrusion
135D spring receptacle
135E protrusion backup surface
135F backup surface lateral portion
135G spring receptacle upper surface
136 lid
137 guide bush flange portion
137A flange portion lower surface
137B flange portion upper surface
137C flange portion lateral surface
138 guide bush cylinder
139 inner circumferential surface
S steam valve spring

What is claimed is:

1. A steam valve comprising:
a valve body that is provided with an inner space that forms part of a steam channel that supplies steam to a steam turbine or that extracts steam from a steam turbine, including a valve seat in the steam channel;
a valve plug and a valve stem configured to move the valve plug to close the steam channel by coming into contact with the valve seat and to open the steam channel by coming out of contact with the valve seat, wherein said valve stem is connected to and movable by a lever member that transmits output of a steam valve driving mechanism to the valve stem and that reciprocates the valve plug with respect to the valve seat; and
a cylinder enclosing the valve stem from a radial outer side of the valve stem; and
a guide portion configured to slidably guide the valve stem in a moving direction thereof, wherein said guide portion is provided at an upper end of the cylinder,
wherein the guide portion comprises:
a guide body that encloses the valve stem from a radial outer side of the valve stem;
a guide bush that is detachably attached inside the guide body and has an inner surface which abuts and slides on an outer circumferential surface of the valve stem, and is formed of a material having corrosion resistance;
a steam valve spring which extends in the moving direction of the valve stem at the radial inner side of the cylinder, one end of which is fixed to the valve stem and another end of which comes into contact with the guide body, and which spring biases the valve stem in a direction in which the valve plug is brought into contact with the valve seat, and
a lid fixed to an upper surface of the guide portion,
wherein said guide body is formed of a metal having a higher modulus of rigidity than the guide bush,
the guide bush comprises;
a guide bush cylinder and an annular guide bush flange portion that extends radially outward from an upper end of the guide bush cylinder,
wherein lower end faces of the guide body and the guide bush cylinder are coplanar and form an upper spring receptacle surface which is in contact with an end of the steam valve spring.

2. The steam valve according to claim 1, wherein the guide bush is formed of a material having a lower hardness than the material of which the valve stem is formed.

3. The steam valve according to claim 1, wherein the guide bush is formed of brass.

4. A steam turbine comprising the steam valve according to claim 1.

* * * * *